United States Patent [19]
Irie et al.

[11] Patent Number: 6,072,899
[45] Date of Patent: Jun. 6, 2000

[54] METHOD AND DEVICE OF INSPECTING THREE-DIMENSIONAL SHAPE DEFECT

[75] Inventors: Yoko Irie, Kawasaki; Hideaki Doi, Tokyo; Hiroya Koshishiba, Chigasaki; Mineo Nomoto, Yokohama, all of Japan

[73] Assignee: Hitachi, Ltd., Tokyo, Japan

[21] Appl. No.: 09/012,739

[22] Filed: Jan. 23, 1998

[30] Foreign Application Priority Data

Jan. 23, 1997 [JP] Japan ............................. P09-009934
May 28, 1997 [JP] Japan ............................. P09-138341

[51] Int. Cl.⁷ ...................................................... G06K 9/00
[52] U.S. Cl. ........................... 382/149; 348/125; 382/141
[58] Field of Search .................... 382/145, 147, 382/144, 148, 149, 151, 154; 348/125, 126

[56] References Cited

U.S. PATENT DOCUMENTS

| | | |
|---|---|---|
| 4,654,583 | 3/1987 | Ninomiya et al. . |
| 4,809,308 | 2/1989 | Adam et al. . |
| 4,853,967 | 8/1989 | Mandeville . |
| 4,910,757 | 3/1990 | Kiyasu et al. . |
| 4,953,224 | 8/1990 | Ichinose et al. . |
| 5,097,492 | 3/1992 | Baker et al. . |
| 5,272,763 | 12/1993 | Maruyama et al. . |
| 5,301,248 | 4/1994 | Takanori et al. . |
| 5,459,794 | 10/1995 | Nimomiya et al. ...................... 382/145 |
| 5,517,235 | 5/1996 | Wasserman .............................. 348/126 |
| 5,754,621 | 5/1998 | Suzuki et al. . |
| 5,784,484 | 7/1998 | Umezawa ................................ 382/148 |
| 5,930,382 | 7/1999 | Irie et al. . |

FOREIGN PATENT DOCUMENTS

| | | |
|---|---|---|
| 55-42640 | 3/1980 | Japan . |
| 59-192945 | 11/1984 | Japan . |
| 61-61003 | 3/1986 | Japan . |
| 61-86638 | 5/1986 | Japan . |
| 62-131391 | 6/1987 | Japan . |
| 1-204648 | 8/1989 | Japan . |
| 1-230183 | 9/1989 | Japan . |
| 4-310813 | 11/1992 | Japan . |
| 5-21548 | 1/1993 | Japan . |
| 5-215694 | 8/1993 | Japan . |
| 6-188092 | 7/1994 | Japan . |
| 7-43320 | 2/1995 | Japan . |

OTHER PUBLICATIONS

U.S. application No. 08/169,049, Koshishiba et al.

*Primary Examiner*—Amelia Au
*Assistant Examiner*—Vikkram Bali
*Attorney, Agent, or Firm*—Antonelli, Terry, Stout & Kraus, LLP

[57] ABSTRACT

A three-dimensional shaped defect inspecting method including a three-dimensional shape detection region selecting step for detecting a two-dimensional picture signal by taking a two-dimensional optical picture fluorescence emitted from a detection object and selecting a three-dimensional shape detection region in respect of the detection object based on the detected two-dimensional picture signal, and a three-dimensional shape determining step for detecting a picture signal by taking an optical picture in accordance with a height by reflected light from the detection object and sampling height information with a desired two-dimensional pixel size in respect of the selected three-dimensional shape inspection region with respect to the detected picture signal, thereby calculating and determining a three-dimensional shape, whereby a defect caused by a deficiency in thickness or the like on a wiring pattern of a solid shape, formed on a detection object of a circuit board or the like, can be detected in a short period of time, and its device.

20 Claims, 13 Drawing Sheets

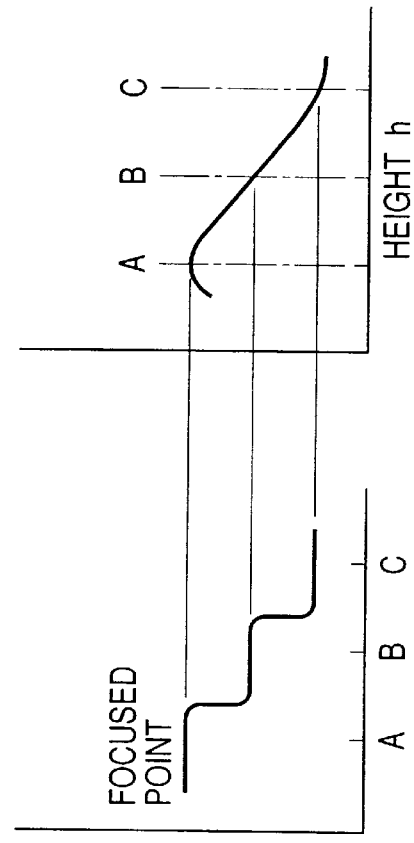
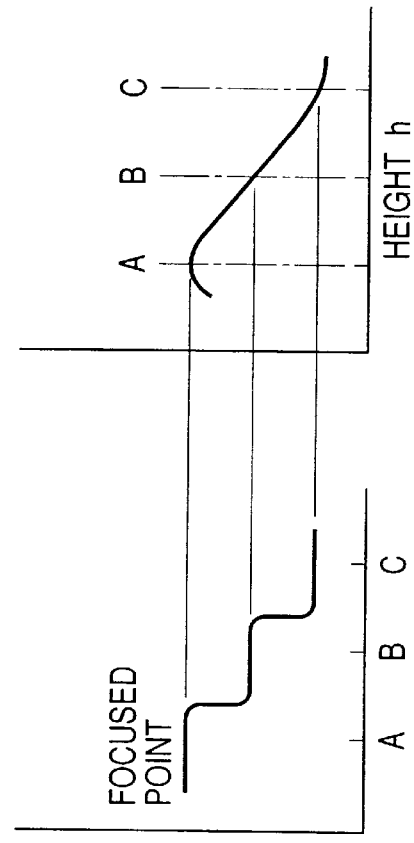
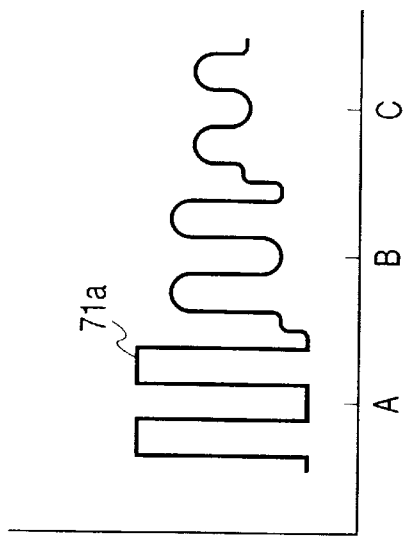
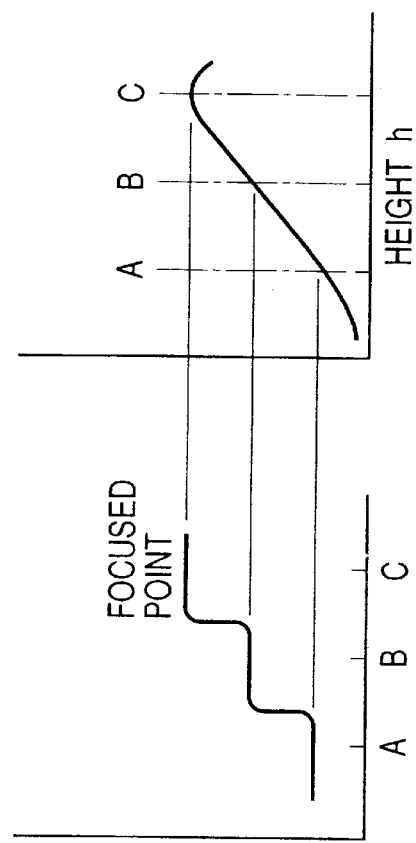
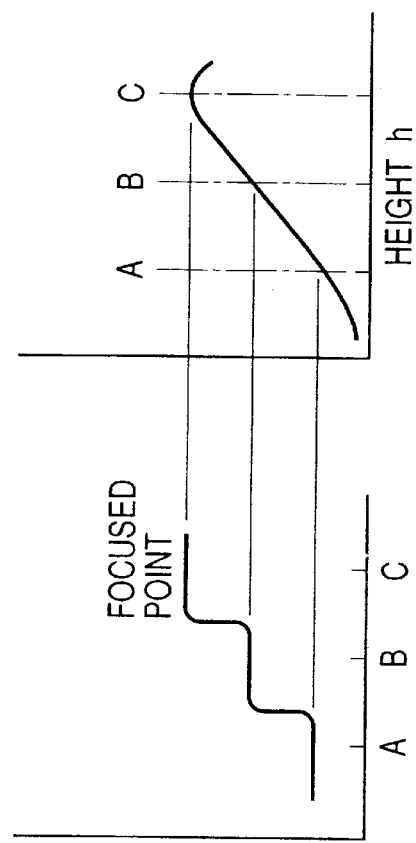
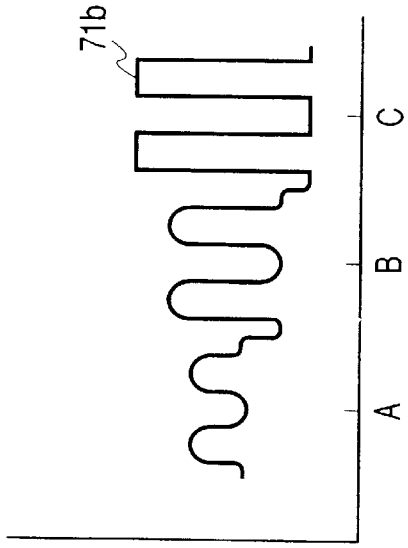

FIG. 13

|   |   |   |   |   |   |
|---|---|---|---|---|---|
| 0 | 0 | 7 | 7 | 0 | 0 |
| 0 | 0 | 6 | 6 | 0 | 0 |
| 0 | 0 | 4 | 4 | 0 | 0 |
| 0 | 0 | 3 | 3 | 0 | 0 |
| 0 | 0 | 4 | 4 | 0 | 0 |
| 0 | 0 | 7 | 7 | 0 | 0 |

| | | | | | | | | | | | |
|---|---|---|---|---|---|---|---|---|---|---|---|
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 1 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |
| 0 | 0 | 0 | 1 | 1 | 1 | 1 | 1 | 0 | 0 | 0 | 0 |

12-6, 12-1, 12-2, 12-7, 12-5

METHOD AND DEVICE OF INSPECTING THREE-DIMENSIONAL SHAPE DEFECT

BACKGROUND OF THE INVENTION

The present invention relates to inspection and fabrication of a printed board in which a wiring pattern is formed on a substrate, a circuit board in which a conductor pattern is embedded in through holes formed on a substrate, a resist pattern on a substrate or the like, and more particularly, the invention relates to a method of inspecting a three-dimensional shaped object for identifying a defect of a three-dimensional shape (solid shape) and a device to perform the method.

There are a number of conventional methods for reproducing a three-dimensional shape from a detected signal. Japanese Unexamined Patent Publication No. JP-A-63-131116 discloses a method, referred to as a cofocal point method, in which reflected light from an object is converged by a lens and the solid shape of the object is detected from a convergence position.

Further, Japanese Unexamined Patent Publication No. JPA-6-201349 discloses a method generally referred to as a SFF (Shape From Focus) method in which pictures are provided by continuously changing the detection position, and the focus position is calculated from the space resolution, that is, the amount of dimness, of respective pixels in the group of pictures by which a three-dimensional shape of an object is detected. Further, the article "Three-Dimensional and Unconventional Imaging for Industrial Inspection and Metrology", by Masahiro Watanabe et al., in the Proceedings of the United States Society of Photo-Optical Instrumentation Engineers (SPIE), Series Vol. 2559, issued on Oct. 23, 1995, discloses a method referred to as a SFD (Shape From Defocus) method in which a texture (pattern) is projected on an object, a relationship between the amount of dimness and the focus position of the texture is previously calculated and the focus position is calculated from the amount of dimness of each pixel of two sheets of pictures having different detection positions.

Further, as a method of inspecting a two-dimensional shape, Japanese Unexamined Patent Publication No. JP-A-5-322795 discloses a method of inspecting a pattern in a fluorescence detection system in which fluorescence generated from a substrate of a printed board is detected as a brightness value, and, since fluorescence is not generated from a wiring pattern made of a metal, the non-generation of fluorescence is detected as a darkness value. According to this method, the presence of a metallic foreign object which is very small, having almost no thickness, but which represents a serious defect in a product, such as a short circuit caused by remaining copper in a printed board, can be detected.

According to the cofocal point system, the solid shape of an object is provided by investigating a cofocal position by changing the focus position, and, therefore, the detection period of time is long. Further, according to this method, point detection is indispensable, while plane detection cannot be carried out as in taking a picture, and, therefore, the detection time is long. Further, according to the SFF and SFD systems, differences in brightness and darkness among contiguous pixels must be measured to calculate the amount of dimness. Therefore, the two-dimensional (planar) resolution is twice as much as that of a pixel. Thus, the inspection time must be prolonged to compensate for the low resolution. In this way, a very long period of time is required for the three-dimensional detection.

Meanwhile, according to the two-dimensional picture detection system, such as fluorescence detection or the like, even when a defect, such as a deficiency in thickness, is present on a wiring pattern of a solid shape that is formed on an object for detection in a circuit board or the like, fluorescence or the like is not generated from that portion, and, therefore, the defect cannot be detected.

SUMMARY OF THE INVENTION

It is an object of the present invention to provide an inspection method and device for detecting a three-dimensional shaped defect, which method and device are capable of detecting, in a short period of time, a defect caused by a deficiency in the thickness or the like in a pattern of solid shape formed on an inspection object, such as a circuit board or the like, in order to resolve the above-described problems.

Further, it is another object of the present invention to provide an inspection method and device for detecting a three-dimensional shaped defect, which method and device are capable of detecting, in a short period of time, both a defect caused by a deficiency in the thickness or the like in a pattern of solid shape formed on an inspection object, such as a circuit board or the like, and a very fine metallic foreign object defect having almost no thickness.

Further, it is other still another of the present invention to provide a method of fabricating a substrate with high quality and low fabrication cost, which method is capable of detecting in a short period of time a defect caused by a deficiency in the thickness of a pattern formed on a substrate of a circuit board or the like.

In order to achieve the above-described objects of the invention, the present invention provides a three-dimensional inspection by inspecting a three-dimensional shape with high accuracy in a short period of inspection time by carrying out two-dimensional shape detection (two-dimensional inspection), and, at the same time, cutting out (selecting) a region necessary for three-dimensional shape detection (three-dimensional inspection) with high accuracy and carrying out three-dimensional inspection with a desired two-dimensional resolution (two-dimensional pixel size) and height resolution with respect to the cut-out region in a short period of time.

Further, according to an aspect of the present invention, there is provided a method of inspecting a three-dimensional shaped defect, including a first picture signal detecting step of providing a two-dimensional picture signal by taking a picture of an inspection object, a three-dimensional shape inspection region selecting step of selecting a three-dimensional shape inspection region of the inspection object based on the two-dimensional picture signal provided by the first picture signal detecting step, a second picture signal detecting step of detecting a picture signal by taking an optical picture in accordance with a height of the inspection object, and a three-dimensional shape determining step of determining the presence or absence of a defect of a three-dimensional shape by calculating the three-dimensional shape by sampling height information with a desired two-dimensional pixel size in respect of the three-dimensional shape inspection region selected with respect to the picture signal detected by the second picture signal detecting step.

Further, according to another aspect of the present invention, there is provided a method of inspecting a defect of a pattern including a two-dimensional picture signal detecting step of detecting a two-dimensional picture signal by taking a picture of an inspection object, a two-dimensional defect detecting step of detecting a two-dimensional defect on the inspection object based on the two-dimensional picture signal detected by the two-dimensional picture signal detecting step, a three-dimensional shape detection region selecting step of selecting a three-dimensional shape detection region in respect of a pattern formed on the inspection object based on the two-dimensional picture signal detected by the two-dimensional picture signal detecting step, and a three-dimensional shape determining step of determining presence or absence of a defect by calculating a three-dimensional shape in respect of the pattern by detecting a picture signal by taking an optical image in accordance with a height by a reflected light from above the inspection object and sampling height information with a desired two-dimensional pixel size in respect of the selected three-dimensional shape detection region with respect to the detected picture signal.

Further, according to another aspect of the present invention, there is provided a three-dimensional shaped defect inspecting method including a picture taking step of providing a two-dimensional picture signal by taking a picture of an inspection object, a three-dimensional shape inspection region selecting step of selecting a three-dimensional shape inspection region of the inspection object based on the two-dimensional picture signal provided by the picture taking step, a three-dimensional shape calculating step of calculating a three-dimensional shape in the three-dimensional shape inspection region in respect of the inspection object selected by the three-dimensional shape inspection region selecting step, and a defect detecting step of determining presence or absence of a defect of the three-dimensional shape calculated by the three-dimensional shape calculating step.

Further, according to another aspect of the present invention, there is provided a three-dimensional shaped defect inspecting device including picture taking means for providing a two-dimensional picture signal by taking a picture of an inspection object, picture detecting means for detecting a picture signal by taking a picture in correspondence with a height of the inspection object, the picture detecting means corresponding to the height, three-dimensional shape inspection region selecting means for selecting a three-dimensional shape inspection region in respect of the inspection object based on the two-dimensional picture signal provided by the picture taking means, three-dimensional shape calculating means for calculating a three-dimensional shape of the three-dimensional shape inspection region selected based on the picture signal detected by the picture detecting means in correspondence with the height, and defect detecting means for determining presence or absence of a defect of the three-dimensional shape calculated by three-dimensional shape calculating means.

Further, according to another aspect of the present invention, there is provided a three-dimensional shaped defect detecting device including first picture detecting means for providing a two-dimensional picture signal by taking a picture of an inspection object, second picture detecting means for providing a picture signal of the inspection object by taking a picture of the inspection object, three-dimensional shape inspection region selecting means for selecting a three-dimensional shape inspection region of the inspection object based on the two-dimensional picture signal provided by the first picture detecting means, and defect detecting means for calculating a three-dimensional shape of the three-dimensional shape inspection region selected based on the picture signal provided by the second picture detecting means and determining presence or absence of a defect of the calculated three-dimensional shape.

As has been explained, according to the above-described features, the three-dimensional shape of the detection object can be inspected at high speed and with high accuracy.

Further, according to the above-described features, inspection of both a deficiency in thickness of a wiring pattern of a circuit board of a printed board or the like and a very fine metallic foreign object defect having almost no thickness can be realized at high speed and with high accuracy.

Further, according to the above-described features, a circuit board, such as a printed board or the like achieving high quality and reduction in fabrication cost can be fabricated.

BRIEF DESCRIPTION OF THE DRAWINGS

FIGS. 9(a), 9(b), 9(c), 9(d), 9(e) and 9(f) are diagrams for explaining a case where the three-dimensional shape detection according to the present invention is carried out based on SFD detection;

FIG. 13 is a diagram showing a height picture (three-dimensional shaped detection picture) detected by the three-dimensional shaped defect inspecting device shown by FIG. 12;

FIG. 15 is a diagram showing a two-dimensional shape detection picture detected by the two-dimensional shape detecting device shown by FIG. 14;

DESCRIPTION OF THE PREFERRED EMBODIMENTS

An explanation will be given of embodiments according to the present invention with reference to the drawings.

Figure 1:
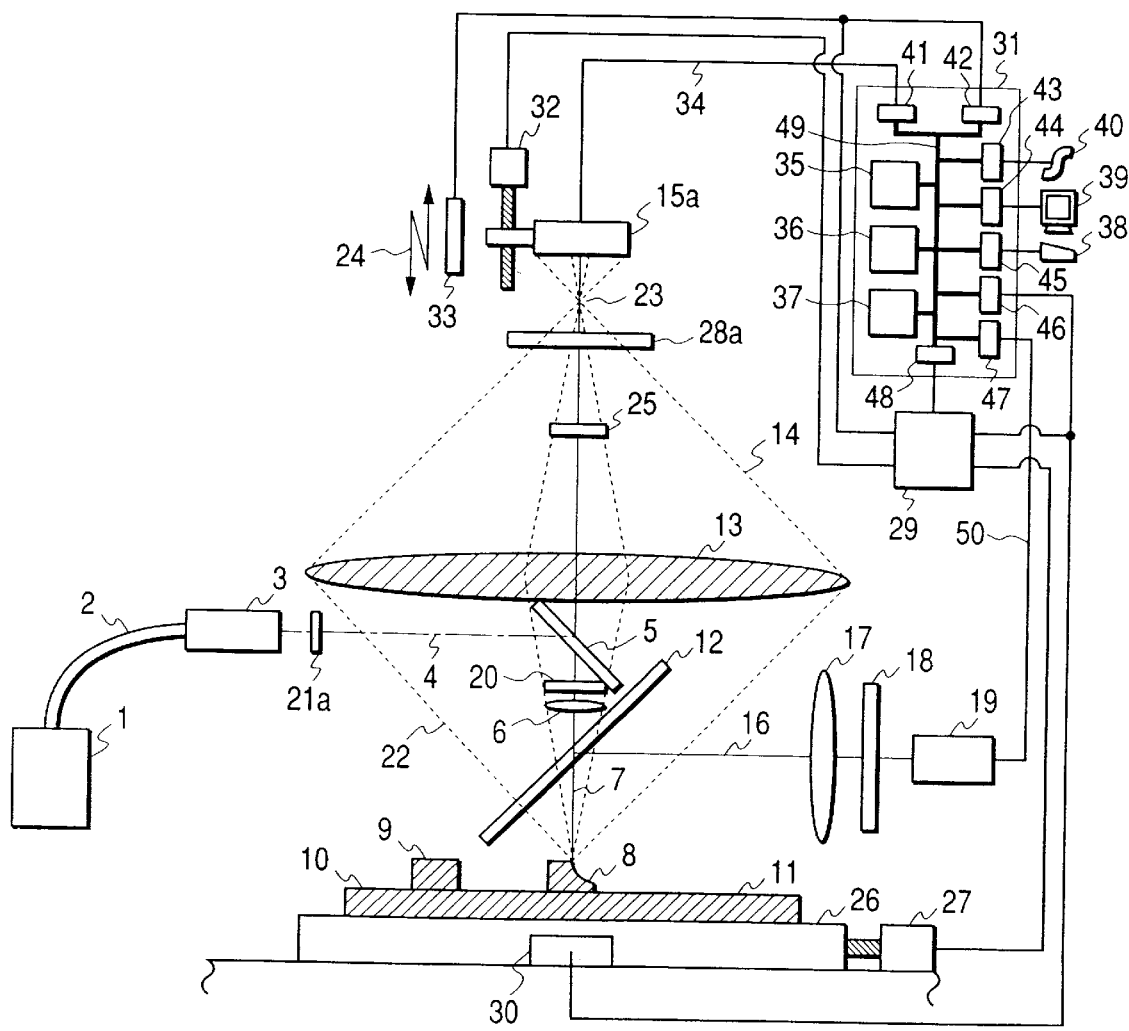
FIG. 1 is a diagram showing a first embodiment of a three-dimensional shaped defect inspecting device according to the present invention.

FIG. 1 shows an embodiment of an optical system of a three-dimensional shaped defect inspecting device according to the present invention.

That is, numeral 1 designates a halogen lamp which operates as a light source for generating exciting light, numeral 2 designates an optical fibre for guiding exciting light generated at the halogen lamp 1, notation 21a designates a diaphragm capable of being variably adjusted for forming a light source picture of the exciting light, numeral 5 designates a mirror for reflecting the exciting light, numeral 20 designates an exciting light filter for transmitting only the wavelength of the exciting light, namely, 200 through 400 nm, numeral 6 designates an object lens for converging and focusing the light source picture produced by the exciting light obtained from a projection mask 21a on an inspection pattern 9, numeral 12 designates a dichroic mirror for transmitting light having the wavelength of 200 through 400 nm focused by the objective lens 6 and reflecting light having the wavelength of 400 through 600 nm which is the wavelength of fluorescence received from the inspection pattern 9, numeral 13 designates a detection lens for converging onto the focal point 23 reflected light 22, reflected from a printed board 11 and having the same wavelength 200 through 400 nm as the exciting light which has been transmitted through the dichroic mirror 12, numeral 25 designates a circular shielding mask for removing reflected light at the central portion of the detection lens 13, notation 28a designates a filter for shielding very weak fluorescence which has been transmitted through the dichroic mirror 12, notation 15a designates a sensor for receiving a reflected light picture from the printed board 11, which is an object of inspection, numeral 17 designates a lens for converging fluorescence which is generated from a substrate 10 and reflected by the dichroic mirror 12, numeral 18 designates a fluorescence filter for transmitting only the wavelength 400 through 600 nm of the fluorescence and numeral 19 designates a CCD (Charge Coupled Device) sensor for receiving a fluorescence picture and outputting a fluorescence picture signal. Numeral 29 designates a control device which carries out a control operation of moving (scanning) a stage 26 by controlling the drive of a drive system 27 in accordance with displacement of the stage 26 obtained from displacement amount detecting means (displacement meter) 30 based on an instruction from a computer 31 and performs a positioning of the sensor 15a to a location maximizing a light amount detected by the sensor 15a by controlling the drive of a moving mechanism 32 which is constituted by a piezoelectric fine movement mechanism or the like in accordance with a displacement of the sensor 15a indicated from displacement amount detecting means (displacement meter) 33. Numeral 31 designates a computer which is constituted by a CPU (Central Processing Unit) 35, a memory 36 for storing a program, a memory 37 for storing a picture signal or various data, inputting means 38 which is constituted by a key board, a mouse, a record medium or the like, displaying means 39, such as a display or the like, outputting means 40 in the form of a printer, a record medium or the like, interfaces 41 through 48 and a bus line 49 for connecting these elements of the computer. Further, the computer 31 may be connected with outputting means for outputting a result of inspection.

Light emitted from the halogen lamp 1 is guided by the optical fibre 2 and is irradiated from an output face 3. Irradiated illumination light 4 is reflected by the mirror 5 and is irradiated onto the dichroic mirror 12a via the exciting light filter 20, for transmitting only the wavelength 200 through 400 nm of the exciting light, and the lens 6. A dielectric multiple layer film (not illustrated) is formed on the surface of the dichroic mirror 12, light having a wavelength of 400 nm or more corresponding to the wavelength of fluorescence is reflected and light having a wavelength of 200 through 400 nm, that is the wavelength of the exciting light, is transmitted by the dichroic mirror 12. The exciting light 7 which has been transmitted through the dichroic mirror 12 is irradiated onto the surface of the printed board 11, which is the object for inspection mounted on the stage 26. With respect to the printed board 11, the wiring pattern 9 is formed on the surface of the substrate 10, which includes an organic substance. Numeral 8 designates a defect on the wiring pattern 9.

Very weak fluorescence (wavelength of 400 through 600 nm) generated at a portion of the substrate 10 made of an organic substance, when the substrate is excited by the exciting light 7, is reflected by the dichroic mirror 12 and is detected by the CCD sensor 19 via the lens 17 and the fluorescence filter 18 for transmitting only the wavelength 400 through 600 nm of the fluorescence. The reason for such a duplex arrangement of the dichroic mirror 12 and the fluorescence filter 18 is that the fluorescence generated from the surface of the substrate 10 excited by the exciting light is very weak, while the intensity of the exciting light reflected particularly by the wiring pattern 9 in the printed board 11 is large; therefore, only very weak fluorescence can be received by the CCD sensor 19 by completely shielding the exciting light which has been reflected by the dichroic mirror 12 very slightly by the fluorescence filter 18. In this way, the fluorescence is generated at the portion of the substrate 10 and the fluorescence is not provided from the portion of the wiring pattern 8 by which a two-dimensional fluorescence picture signal 50, indicating where the portion of the substrate 10 is brightened and the portion of the wiring pattern 9 is darkened, can be outputted from the CCD sensor 19 by two-dimensionally moving (scanning) the stage 26 mounted with the printed board 11, which is the detection object relative to the above-described detection optical system by the drive system 27, which is driven on the basis of control from the control device 29. Numeral 30 designates the displacement amount detecting means for detecting a displacement amount of the stage 26, which detected displacement amount is inputted to the computer 31 or to the control device 29.

In the meantime, the reflected light 22 from the printed board 11 has the same wavelength 200 through 400 nm as the irradiated exciting light, and, accordingly, the reflected light 22 passes through the dichroic mirror 12 and is converged at the focal point 23 via the lens 13 and is detected by the sensor 15a. Incidentally, the reflected light 22 includes scattered light. The mirror 5 is arranged at the center of the lens 13, and, therefore, light 14 in the reflected light 22, at an exterior side portion excluding the central portion of the detection lens 13, is received by the sensor 15a. Incidentally, the reflected light from the central portion of the detection lens 13 may be removed by installing the circular shielding mask 25. Further, the sensor 15a is moved along an up and down direction 24 by the moving mechanism 32 that is driven on the basis of control from the control device 29, and a detection signal 34, which is detected as a detection light amount, is inputted from the sensor 15a to the computer 31. CPU 35 in the computer 31 detects the position of the focal point 23 which is detected by the displacement amount detecting means (displacement meter) 33 for maximizing the detection light amount of the inputted detection signal 34 and calculates the height of the detection object by this detecting operation and stores the height in the memory 37. That is, with respect to the computer 31, the CPU 35 can detect the three-dimensional shape using the cofocal point detection system and store it in the memory 37 and output it.

In the computer 31, CPU 35 obtains information of a two-dimensional shape with respect to the wiring pattern 9 on the basis of the two-dimensional fluorescence picture signal 50, in accordance with the fluorescence detection system, as inputted from the CCD sensor 19, and stores the information in the memory 37. Further, CPU 35 detects the position of the focal point 23, which is detected by the displacement amount detecting means (displacement meter) 33 for maximizing the detection light amount of the detection signal 34 detected by the sensor 15a on the basis of the two-dimensional shape information with respect to the calculated wiring pattern 9, by means of the three-dimensional shape detection comprising two-dimensional dimensions and the height necessary for the wiring pattern 9. Normally, with respect to the printed board 11 that is the detection object, it is not necessary to carry out the three-dimensional detection with respect to the surface areas of the substrate portion 10, and, therefore, the three-dimensional detection may be carried out only for the wiring pattern 9. In this regard, the two-dimensional shape of the wiring pattern 9 has already been obtained by the fluorescence detection system, and, therefore, the accuracy of the two-dimensional shape detection in the three-dimensional shape detection can be lowered. Thereby, high accuracy detection of the wiring pattern or the like can be realized in a short period of inspection time.

Figure 2:
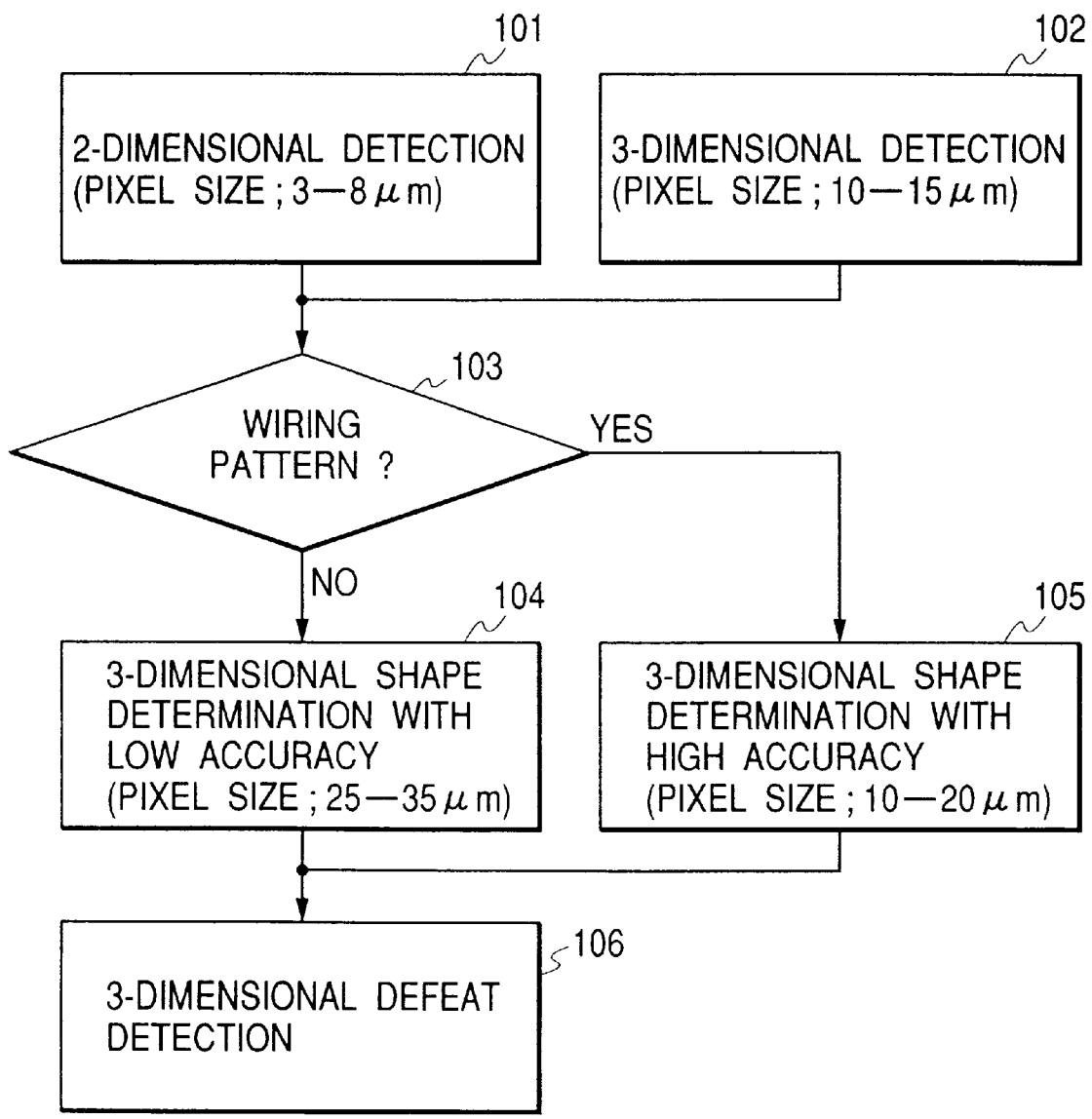
FIG. 2 is a flow diagram showing a processing flow of three-dimensional defect detection according to the present invention.

That is, the computer 31 carries out three-dimensional defect detection by performing a processing shown in FIG. 2 with respect to the detection object, such as the printed board 11 or the like, and displays the result on the displaying means 39 or outputs the result by using the outputting means 40. Further, the result of the three-dimensional defect detection can be outputted to the control system for controlling fabrication of the detection object, such as the printed board 11 or the like, by transmitting the result via a network.

Step 101 in FIG. 2 is a step of two-dimensional shape detection (pixel size is about 3 through 8 $\mu$m) which is processed by CPU 35 on the basis of the two-dimensional fluorescence picture signal 50 produced by the CCD sensor 19 in the fluorescence detection system. Step 102 is a step of three-dimensional shape detection (pixel size is about 10 through 20 $\mu$m) performed on the basis of positional information of the focal point 23 that is detected by the displacement amount detecting means (displacement meter) 33 for maximizing the detection light amount of the detection signal 34 that is detected by the sensor 15a.

Step 103 is a step in which CPU 35 determines whether the detection object is the wiring pattern (corresponding to three-dimensional shape determining region with high accuracy) based on the two-dimensional shape detection.

Step 104 is a step in which CPU 35 carries out three-dimensional shape determination (pixel size; 25 through 35 $\mu$m) with low accuracy (low resolution) on the basis of the three-dimensional shape detection for detecting a defect in the form of a large recess or the like present in the substrate 10 when the detection signal is determined not to be the wiring pattern 9 (which corresponds to the three-dimensional shape determining region with high accuracy) at step 103. Incidentally, the step 104 may be dispensed with since normally, the possibility of causing a defect in the form of a large recess or the like in the base portion 10 is extremely small with respect to the printed board 11 representing the detection object.

Step 105 is a step in which CPU 35 carries out the three-dimensional shape determination (pixel size; 10 through 20 $\mu$m) with high accuracy (high resolution) with respect to two-dimensional dimensions and height on the basis of the three-dimensional shape detection when the detection signal is determined to be the wiring pattern 9 at step 103.

Step 106 is a step of providing a result of the three-dimensional defect detection provided on the basis of a result of the three-dimensional shape determination with low accuracy which has been performed in step 104 and a result of the three-dimensional shape determination with high accuracy which has been performed in step 105. When the step 104 is dispensed with, the step 106 is a step of providing the result of the three-dimensional defect detection which is obtained on the basis of the result of the three-dimensional shape determination with high accuracy that has been performed in step 105.

Although, according to the embodiment explained above, an explanation has been given of the case where the height information of the detection object is calculated by the cofocal point detection system, the height information can also be calculated using the detection light intensity distribution. That is, in FIG. 3 and FIG. 4, the system is constituted by a CCD sensor 15b in place of the sensor 15a shown by FIG. 1. The computer 31 calculates the height of the detection object on the basis of data indicating a relationship between the detection light intensity distribution with respect to a reference detection light intensity distribution which is provided from a normal wiring pattern that is previously registered and the height of the detection object from the detection light intensity distribution detected by and inputted from the CCD sensor 15b.

Figure 3:
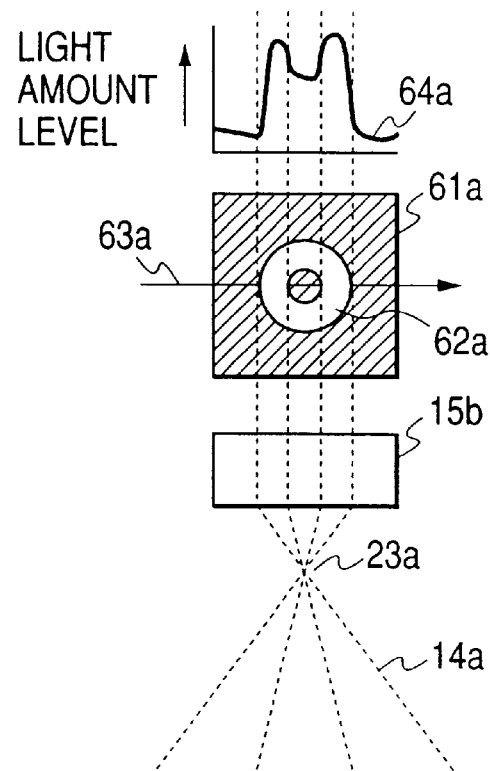
FIG. 3 is a diagram for explaining an embodiment in which the three-dimensional shaped defect inspection according to the present invention is carried out from a light intensity distribution of detected light based on cofocal point detection and is a view showing a light intensity distribution of detected light obtained from a normal wiring pattern.

FIG. 3 shows a result of detecting a wiring pattern 9 having a normal thickness. That is, in FIG. 3, notation 64a designates a detection light pattern obtained via the lens 13 for light reflected from a wiring pattern 9 having a normal thickness, notation 63a designates the position of the focal point of the light focused via the lens 13 after being reflected from the normal wiring pattern 9, notation 61a designates a light picture which the CCD sensor 15b receives when the normal wiring pattern 9 is detected, and notation 62a designates detection light being received by the CCD sensor 15b when the normal wiring pattern 9 is detected. The detection light pattern 64a indicates the signal level of the light intensity distribution at the scanning line 63a when a wiring pattern 9 having a normal thickness is detected by the CCD sensor 15b.

Figure 4:
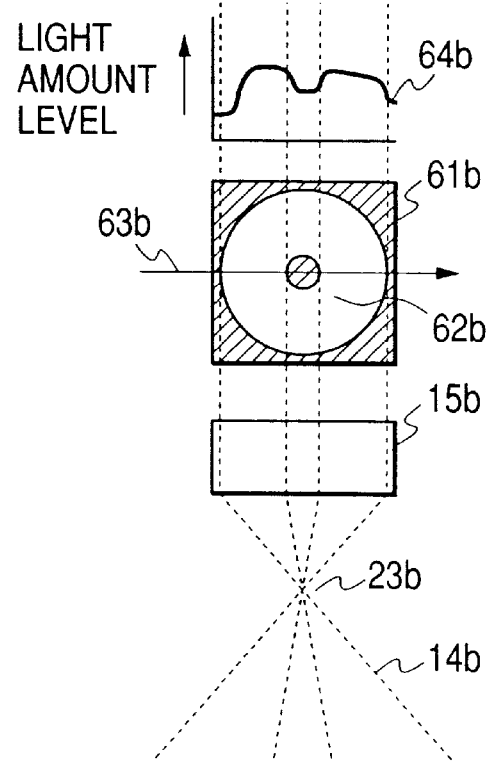
FIG. 4 is a diagram for explaining an embodiment in which the three-dimensional shape defect inspection according to the present invention is carried out from the light intensity distribution of detected light based on the cofocal point detection and is a view showing a light intensity distribution of detected light obtained from a wiring pattern where a chipping defect is present.

FIG. 4 shows a result of detecting a wiring pattern 8 which has a defect. That is, in FIG. 4, notation 64b designates a detection light pattern obtained via the lens 13 for light reflected from the wiring pattern 8 that has a defect, notation 63b designates the position of the focal point where the light is focused via the lens 13 after being reflected from the wiring pattern 8 that has a defect, notation 61b designates a light picture which the CCD sensor 15b receives when the wiring pattern 8 that has a defect is detected, and notation 62b designates detection light which is received by the CCD sensor 15b when the wiring pattern 8 that has a defect is detected. The detection light pattern 64b indicates the signal level of the light intensity distribution at the scanning line 63b when a wiring pattern 8 that has a defect is detected by the CCD sensor 15b.

As has been explained, with reference to the case where the wiring pattern 9 having a normal thickness is detected, as shown in FIG. 3, when a defect produced by chipping or the like is present on the wiring pattern 9, as shown in FIG. 4, the position of the focal point 23b is moved in the lower direction. Therefore, with respect to the light intensity distribution 64b where a defect produced by chipping or the like is present on the wiring pattern 9, compared with the reference light intensity distribution 64a, the area is widened and the light intensity is weakened. Accordingly, by registering data representing a correlation of the light intensity distributions at several heights with respect to the reference light intensity distribution 64a previously stored in the memory 36, CPU 35 of the computer 31 can calculate the height information from the light intensity distribution detected by the CCD sensor 15b and can store the result in the memory 37.

In the meantime, the light intensity distribution detected by the CCD sensor 15b is varied by the illuminance of the exciting light irradiated onto the detection object, a projected spot diameter, reflectivity or the like. Hence, by calibrating the reference light intensity distribution 64a registered in the memory 36 on the basis of a light intensity distribution detected by the CCD sensor 15b for the normal wiring pattern 9, the influence of the illuminance of the exciting light irradiated on the detection object, the projected spot of light, the reflectivity or the like can be removed. In this way, CPU 35 of the computer 31 can detect the three-dimensional shape of the detection object using the detected light intensity distribution detected by the CCD sensor 15b. According to this embodiment, it is not necessary to move the CCD sensor 15b in the up and down direction 24, as shown by FIG. 1, and the three-dimensional shape can be detected by the computer 31 at high speed.

Further, the three-dimensional shape of the detection object may be detected not only by the cofocal point system, but also by the SFD (Shape From Defocus) system. In that case, it is necessary to project texture, such as a patterned shadow.

Figure 5:
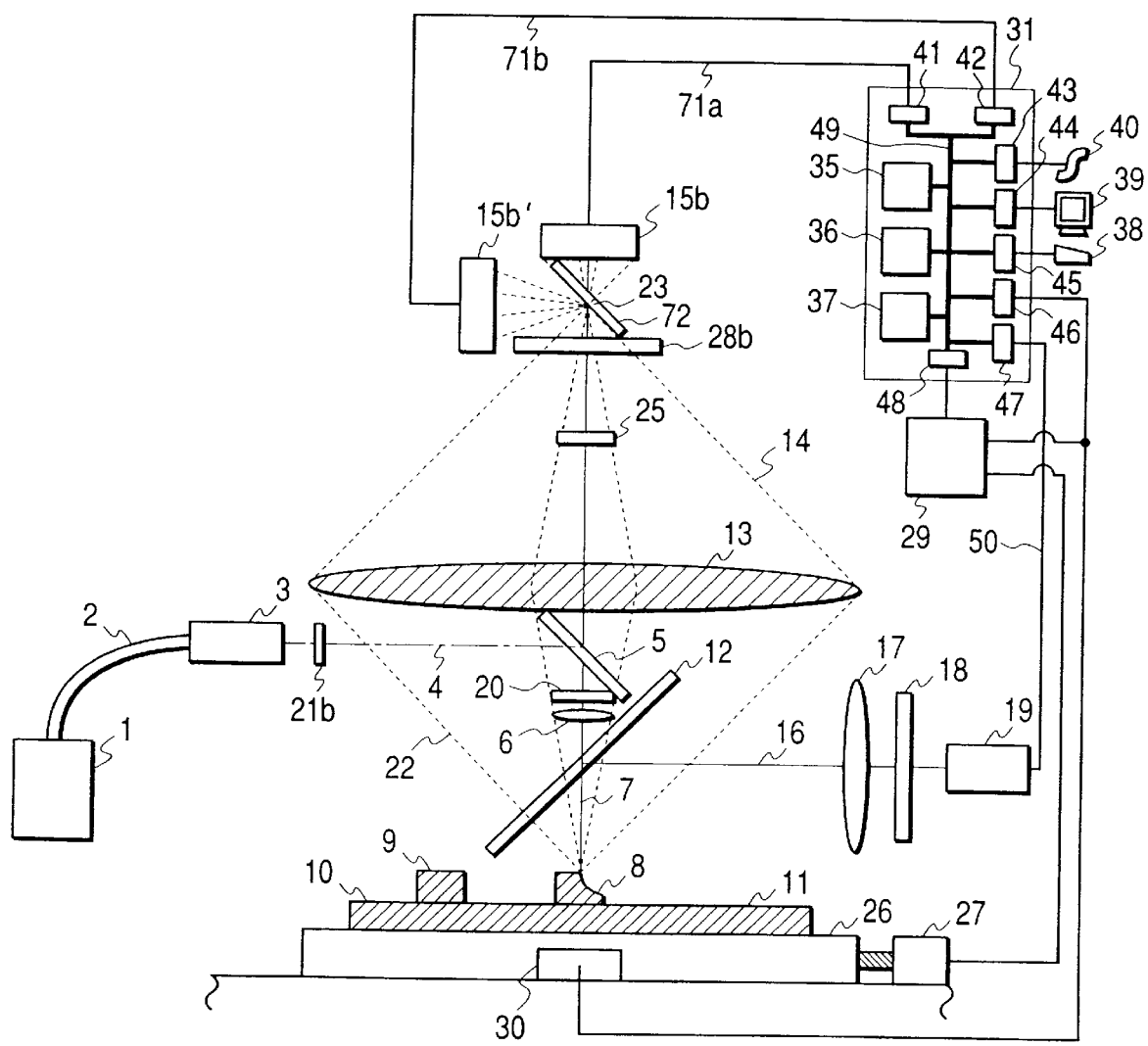
FIG. 5 is a diagram showing a second embodiment of a three-dimensional shaped defect inspecting device according to the present invention.
Figure 6:
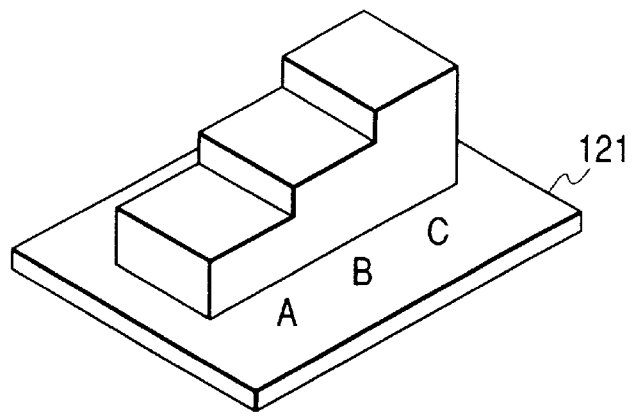
FIG. 6 is a perspective view showing an example of a standard sample.
Figure 7:
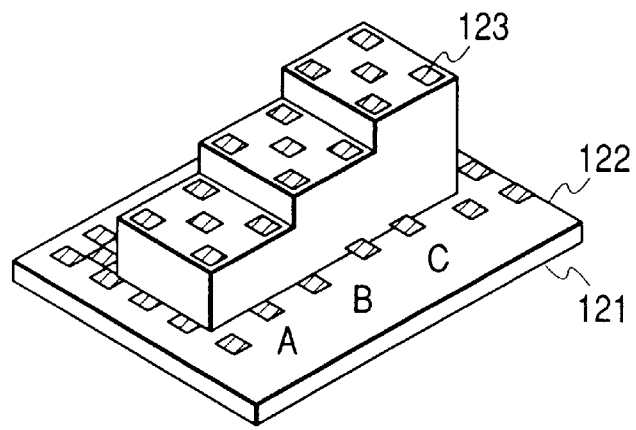
FIG. 7 is a perspective view showing a state where texture is projected on the standard sample.

According to the embodiment shown in FIG. 5, a projection mask 21b is constituted in place of the diaphragm 21a shown in FIG. 1. Numeral 121 in FIG. 6 designates a standard sample having a known height. Numeral 122 in FIG. 7 designates a result of projecting a texture 123 having a checker pattern onto the standard sample 121 shown in FIG. 6 using the projection mask 21b. Numeral 133 in FIG. 8 designates a surface of the texture mask 21b and numeral 131 designates a dielectric multiple layer film formed on the glass mask 21b for transmitting the wavelength of 200 through 300 nm, that is a portion of the wavelength of the exciting light, and for reflecting the wavelength of 300 through 600 nm, that is a portion of the wavelength of the exciting light and the wavelength of the fluorescence. Numeral 132 designates a dielectric multiple layer film, which is different from the dielectric multiple layer film 131, for transmitting the wavelength of 300 through 400 nm and for reflecting the wavelength of 200 through 300 nm, and the wavelength of 200 through 600 nm.

The exciting light having a wavelength of 200 through 300 nm, which has been transmitted through the dielectric multiple layer film 131, is irradiated onto the detection object, such as the printed board 11 or the like, and the exciting light having the wavelength of 300 through 400 nm which has been transmitted through the dielectric multiple layer film 132 is irradiated onto the detection object. Accordingly, the fluorescence is generated from a portion where light from the dielectric multiple layer film 131 has been projected and from a portion where the dielectric multiple layer film 132 has been projected, and, therefore, the fluorescence picture can be detected by detecting fluorescence using the CCD sensor 19, the fluorescence having been reflected by the dichroic mirror 12 and transmitted through the fluorescence filter 18.

In the meantime, reflected light having a wavelength of 200 through 300 nm is generated from the portion where light has been projected through the dielectric multiple layer film 131 and reflected light having a wavelength of 300 through 400 nm is generated from the portion where light has been projected through the dielectric multiple layer film 132. The reflected light is irradiated onto a filter 28b via the lens 13. A dielectric multiple layer film is formed on the filter 28b for transmitting light having a wavelength of 200 through 300 nm and for reflecting light having a wavelength of 300 through 400 nm.

Therefore, the reflected light is detected by CCD sensors 15b and 15b' after being divided by a half mirror 72, such that the portion where light from dielectric multiple layer film 131 has been projected is brightened and the portion where light from the dielectric multiple layer film 132 has been projected is darkened. Incidentally, the CCD sensor 15b is installed at a location where a projected picture of the A face of the standard sample 121 is focused and the CCD sensor 15b' is installed at a location where a projected picture of the C face of the standard sample 121 is focused. The two CCD sensors are installed in such a manner, since the states of dimness are caused symmetrically from the focused height.

As has been explained, according to the embodiment, no influence of texture is effected for the fluorescence detection picture, and a texture projected picture is provided for the reflected light detection picture. Hence, the CCD sensors 15b and 15b' take the texture projected picture projected onto the standard sample 4-1, a picture signal 71a shown by FIG. 9(a) is detected from the CCD sensor 15b and a picture signal 71b shown by FIG. 9(d) is detected from the CCD sensor 15b'. Further, the picture signals 71a and 71b are inputted to the computer 31.

CPU 35 of the computer 31 provides a differentiated value indicating a focused state shown by FIG. 9(b) by performing a differential Laplacian operation or the like with respect to the picture signal 71a and provides a differentiated value indicating a focused state shown by FIG. 9(e) by performing a differential Laplacian operation or the like with respect to the picture signal 71b. Further, by inputting information of a known height "h" of the standard sample 121, a relationship between the height "h" and the differentiated value obtained from the picture signal 71a, as shown by FIG. 9(c), and a relationship between the height "h" and the differentiated value obtained from the picture signal 71b, as shown by FIG. 9(f), are provided to and registered in the memory 36 as data for calculating height.

Accordingly, by actually projecting a texture onto the detection object, such as the printed board 11 or the like, and taking a texture projected picture using the CCD sensors 15b and 15b', the picture signals 71a and 71b shown by FIGS. 9(a) and 9(d) are obtained and inputted to the computer 31. CPU 35 of the computer 31 obtains differentiated values indicating the focused states by performing a differential Laplacian operation or the like on the inputted picture signals 71a and 71b, and, from the differentiated values, the height of the detection object can be calculated on the basis of data for calculating the height registered in the memory 36, for example, the three-dimensional shape of the wiring pattern 9 can be provided, and, as a result, the chipping defect 8 present on the wiring pattern 9 can be detected.

Next, an explanation will be given of other embodiments where the three-dimensional shape detection of a detection object is carried out by a SFD (Shape From Defocus) method.

Figure 10:
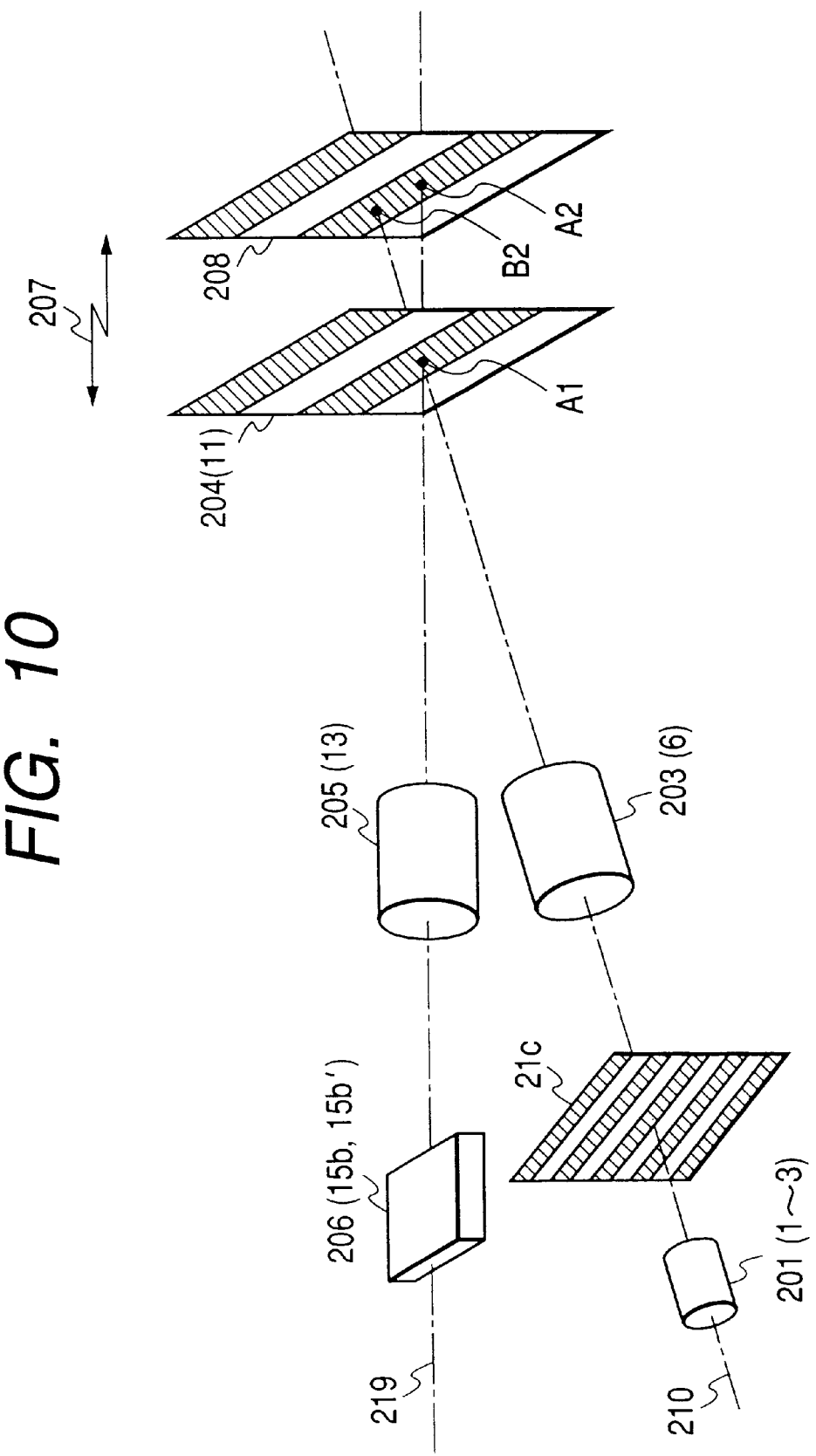
FIG. 10 is a diagram showing an embodiment where a texture of a striation pattern is used in the case where the three-dimensional detection according to the present invention is carried out based on SFD detection.

FIG. 10 is a view showing a detection optical system using SFD. Light irradiated from a light source 201 (1-3) is irradiated onto a detection object 204, such as the printed board 11 or the like, having a three-dimensional shape via a projection mask 21c and a lens 203 (6). Reflected light from the detection object 204 (11) is detected by a line sensor 206 (15b, 15b'), which operates as a detector and receives the reflected light via a lens 205 (13). The line sensor 206 (15b, 15b') may be moved along a height direction 207 similar to the arrangement shown in FIG. 1, or the optical path may be divided by the half mirror 72 and two of the line sensors 206 (15b, 15b') may be arranged with different heights similar to the arrangement shown in FIG. 5.

Figure 11:
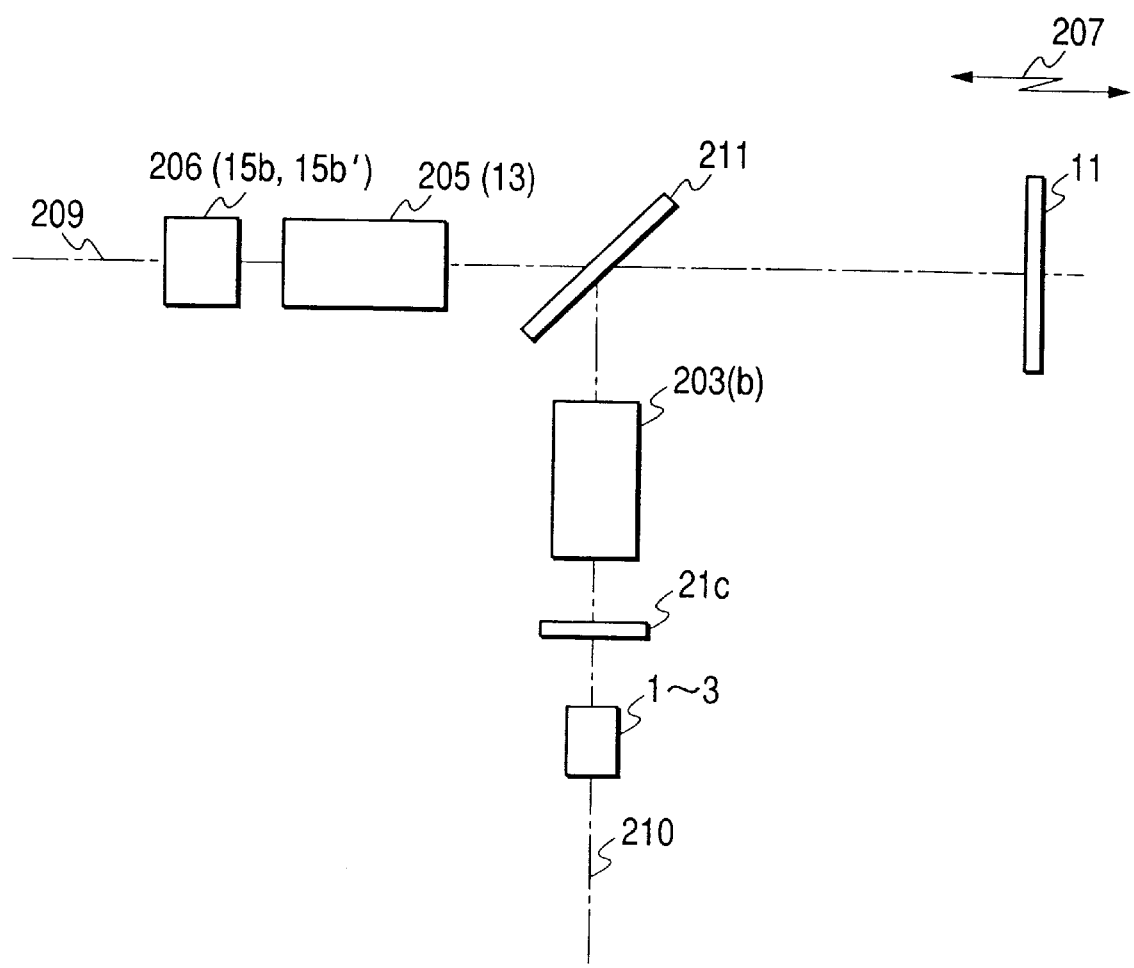
FIG. 11 is a view showing an embodiment when an irradiation light axis and a detection light axis are made to be orthogonal to each other in the case where the three-dimensional shape detection according to the present invention is carried out based on SFD detection.

An irradiation light axis 210 is arranged obliquely relative to a detection light axis 209. This arrangement has the advantage that the detection light amount is increased by 4 times compared with a method in which the irradiation optical axis 210 is arranged to be orthogonal to the detection light axis 209 and a half mirror 211 is arranged at an intersection, as shown by FIG. 11, similar to the embodiment shown in FIG. 5. However, in FIG. 10, when the inspection object 204 (11) is moved along the height direction 207 to a location designated by numeral 208, although point A1 on the detection object is moved to point A2, the point of the projected texture is moved to point B2.

Figure 8:
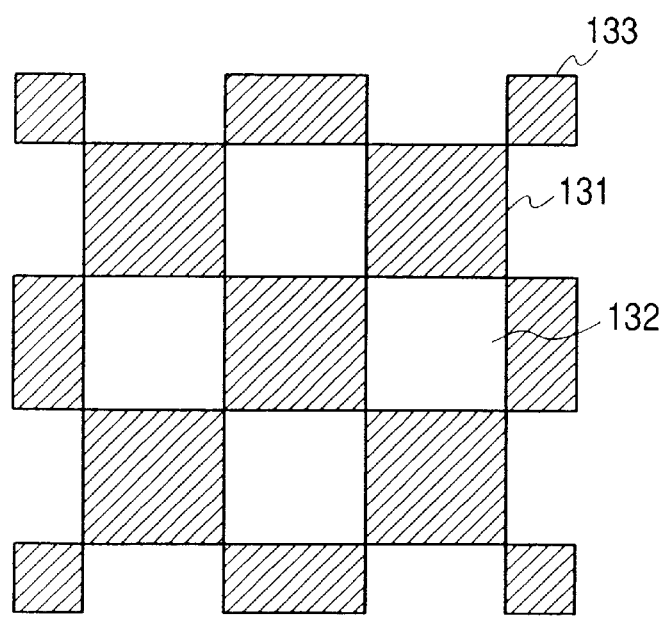
FIG. 8 is a diagram showing a texture formed on a projection mask.

When the texture is a checker pattern, point A1 and point A2 are projected with different patterns, that is, although point A1 is projected with the portion 131 shown by FIG. 8, point A2 is projected with the portion 132 shown by FIG. 8. In this case, SFD detection cannot be carried out. However, when the texture is a striation pattern designated by notation 21c in FIG. 10 and the direction of the parallel striation is made parallel to a plane formed by the irradiation light axis 210 and the detection light axis 209, point A1 and point A2 are present always on the same pattern. In this way, by increasing the detection light amount, the detection period of time can be shortened.

Incidentally, although, according to the embodiments described above, it is assumed that the substrate 10 is made of an epoxy resin for the printed board 11 of the detection object, that the wavelength of exciting light is set to 200 through 400 nm and that the wavelength of fluorescence is set to 400 through 600 nm, it is apparent that the above-described wavelengths may be changed in accordance with the material of the detection object.

Further, although, according to the embodiments of the present invention, as shown by FIG. 1 and FIG. 5, an explanation has been given of the cases where the irradiation optical system 1, 2, 3, 5, 6 and 20 are commonly used and the optical system for detecting fluorescence 12, 17, 18 and 19 and the optical system for detecting height 13, 28 and 15 on the basis of reflected light are arranged on the same optical axes, the optical system for detecting fluorescence 12, 17, 18 and 19 and the optical system for detecting height 13, 28 and 15 based on the reflected light may be installed separately on different optical axes and the irradiation optical system may be installed to correspond to the optical system 12, 17, 18 and 19 and the optical system for detecting height 13, 28 and 15 based on the reflected light which are separately installed.

In this case, regarding the computer 31, the distance between the optical axis of the optical system for detecting fluorescence 12, 17, 18 and 19 and the optical axis of the optical system for detecting height 13, 28 and 15 based on the reflected light is a known value, and, therefore, when the two-dimensional detection picture signal obtained by fluorescence detected by the sensor 19 on the basis of the displacement amount of the stage 26, which is detected by the displacement amount detecting means 30 that is constituted by, for example, a laser length measuring machine performing the detection with high accuracy, and the three-dimensional detection picture signal, which is detected by the sensor 15, are positioned with an accuracy smaller than the pixel size 3 through 8 $\mu$m of the two-dimensional detection, the two-dimensional information of, for example, a wiring pattern provided by the two-dimensional detection can be used in the three-dimensional detection.

That is, when the displacement amount of the stage 26 detected by the displacement amount detecting means 30 becomes the above-described known distance between optical axes, the two-dimensional detection picture signal provided by fluorescence that is detected by the sensor 19 and the three-dimensional detection picture signal that is detected by the sensor 15 coincide with each other two-dimensionally.

Accordingly, by inputting the above-described known distance between optical axes into the computer 31 using the inputting means 38, the two-dimensional detection picture signal provided by fluorescence, which is detected by the sensor 19, and the three-dimensional detection picture signal, which is detected by the sensor 15, can be positioned with an accuracy smaller than the pixel size 3 through 8 $\mu$m of the two-dimensional detection in the CPU 35. Thereby, the processing shown by FIG. 2 can be executed in the CPU 35.

Figure 14:
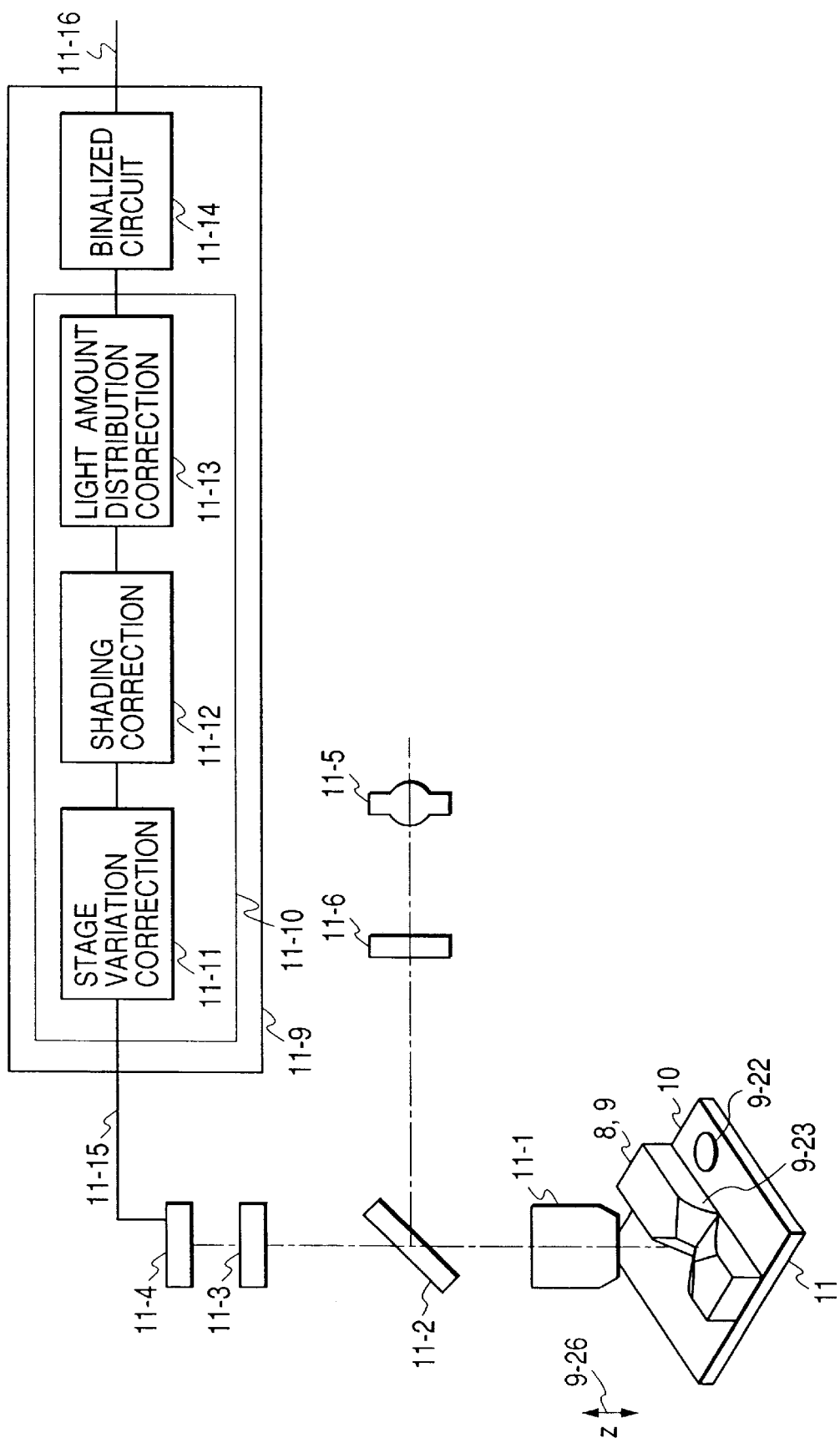
FIG. 14 is a diagram showing an embodiment of a two-dimensional shape detecting device operating on the basis of reflected light detection according to the present invention.

Next, an embodiment having another constitution will be described. It is assumed in the embodiment that an optical system in a three-dimensional shape detection device shown in FIG. 12 and an optical system in a two-dimensional shape detection system shown in FIG. 14 are installed in parallel with each other with a known interval. Further, picture signals provided from the respective first, second and third sensors 9-2, 9-3 and 9-4 are obtained in correspondence with coordinates of the XY positions of an XY stage for mounting the object 11. Also, a picture signal provided from a CCD sensor 11-4 is obtained in correspondence with coordinates of XY positions of the object 11 and the XY stage for mounting the object 11. Therefore, as shown by FIG. 12, by storing a two-dimensional binary signal 11-16 provided from a picture processing device 11-9 in a delay storing circuit 9-42 in a picture processing device 9-40 and shifting the signal, and by delaying the signal by the above-described known interval, the two-dimensional binary signal 11-16 recognizing a pattern designated by notation 16-7 in FIG. 16, which is obtained from the two-dimensional shape detection device, and a signal 9-11 showing a three-dimensional shape designated by notation 16-4, provided from the three-dimensional shape detection device, can be positioned, and by logically comparing these two signals in a comparison determining circuit 9-44, a defect signal (pattern defect) shown by the three-dimensional shape in the region of the pattern recognized by the two-dimensional binary signal can be determined.

Figure 12:
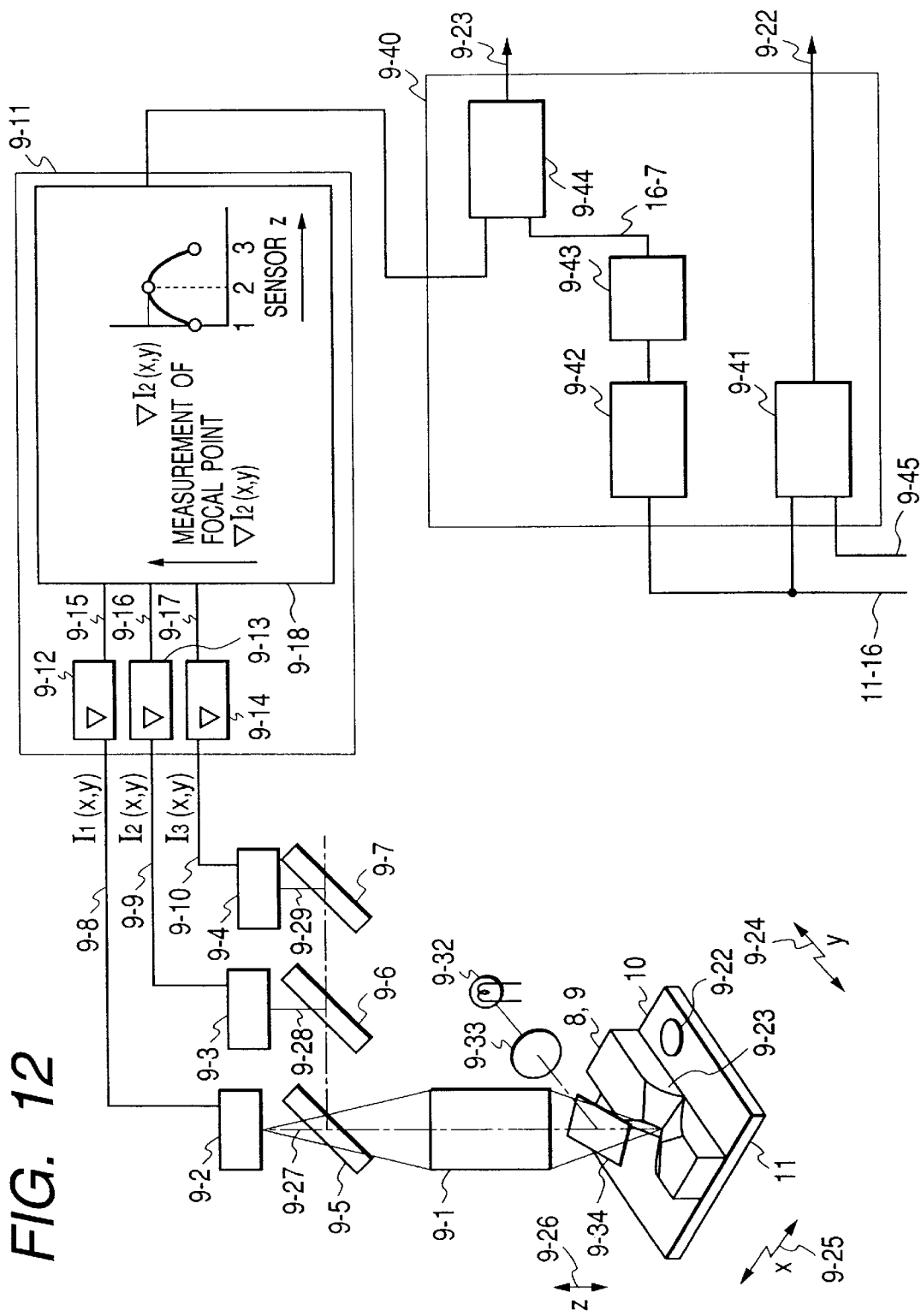
FIG. 12 is a constitutional diagram showing an embodiment of a three-dimensional shape defect inspecting device according to the present invention using SFF detection.

Further, from the first sensor 9-2 in the three-dimensional shape detection device shown in FIG. 12, a two-dimensional picture signal similar to the picture signal obtained from the CCD sensor 11-4 in the two-dimensional shape detection device shown in FIG. 14 can be obtained. In this case, the two-dimensional binary signal 11-16, recognizing the pattern shown by notation 16-7 in FIG. 16, and the signal 9-11 showing the three-dimensional shape designated by notation 16-4, which is provided from the three-dimensional shape detection device, can be detected, and these two signals can logically be compared by a comparison determining circuit 9-44, that is, a defect signal (pattern defect) shown by the three-dimensional shape in the region of the pattern recognized by the two-dimensional binary signal can be determined.

FIG. 12 shows the three-dimensional shape detection device using SFF (Shape From Focus). Numeral 11 designates the printed board that represents an object of inspection and numeral 10 designates the substrate of the printed board on which the copper wiring patterns 8 and 9 are formed. The printed board 11 is arranged on an XY stage and is scanned in the X direction 9-24 and the Y direction 9-25. The up and down direction is the Z direction 9-26.

A defect 9-23 represented by a deficiency in thickness, where the surface is exfoliated and the thickness becomes a half of that at a normal portion, is present on the pattern (wiring pattern) 8. Further, a copper residue defect 9-22, where copper is etched extremely thinly and remains, is present.

Notation 9-32 designates a light source for irradiation, notation 9-33 designates a converging lens for converging irradiation light emitted from the light source for irradiation 9-32 and notation 9-34 designates a half mirror for irradiating the object 9-30 by reflecting the irradiation light converged by the converging lens 9-33. Notation 9-1 designates a lens which is arranged to focus pictures of the pattern 8 and 9 of the printed board onto the first sensor 9-2. A half mirror 9-5 is inserted between the lens 9-1 and the first sensor 9-2 and the picture is also focused onto a second sensor 9-3 and a third sensor 9-4.

In that case, an optical path length 9-27 between the lens 9-1 and the first sensor 9-2 is arranged to be shorter than an optical path length 9-28 between the lens 9-1 and the second sensor 9-3 and an optical path length 9-29 between the lens 9-1 and the third sensor 9-3 is arranged to be longer than the optical path length 9-28. The first sensor 9-2 is arranged at a location relative to the surface of the substrate 10 of the printed board 11 which represents a focal point, that is, at a location relative to the positions of the bottoms of the wiring patterns 8 and 9 of the printed board as focal points, the second sensor 9-3 is arranged at a location relative to a middle point of the height of the normal wiring pattern 9 as a focal point and the third sensor 9-4 is arranged relative to an upper face of the normal wiring pattern 9 as a focal point.

Accordingly, when the sensors detect the surface of the substrate, the detection picture of the first sensor 9-2 is mostly focused and the detection picture of the second sensor 9-3 is defocused and dimmed. The detection picture of the third sensor 9-4 is further defocused and dimmed. Further, when the sensors detect the surface of the wiring pattern, the detection picture of the third sensor 9-4 is mostly focused and the detection picture of the second sensor 9-3 is defocused and dimmed. The detection picture of the first sensor 9-2 is further defocused and dimmed.

Further, when the sensors detect the pattern thickness deficiency defect 9-23, the detection picture of the second sensor 9-3 is mostly focused and the detection pictures of the first sensor 9-2 and the third sensor 9-4 are defocused and dimmed.

When the dimness of the detection pictures produced by the respective sensors, that is, a measure of the focus is investigated, the height of the wiring pattern can be detected. Outputs from the first, the second and the third respective sensors are designated by outputs 9-8, 9-9 and 9-10, respectively. The respective outputs are inputted to the picture processing device 9-11 and quadratic differentials are outputted from quadratic differential calculators 9-12, 9-13 and 9-14. In this case, with respect to the detection pictures, the contrast is clear in a picture that is mostly focused, and, therefore, the value of the quadratic differential is increased for such a picture.

The contrast is not clear with respect to a picture that is out of focus and dimmed, and, therefore, the value of the quadratic differential is decreased for such a picture. Therefore, the value of the quadratic differential represents a measure of the focus. The outputs 9-15, 9-16 and 9-17 from the respective quadratic differential calculators are inputted to a height calculator 9-18 where the sensor having an input with the highest measure of focus is specified and the height of the object is measured. In this case, the distributions of the measurements of the respective sensors are constituted by a Gaussian distribution, and, therefore, the focused position may be calculated by predicting the position by interpolation of the distribution. The series of processings are carried out with respect to all of the pixels, the values of which are outputted from the sensors. In this way, the height picture output 9-19 is provided with respect to the detection picture of the sensors.

FIG. 13 shows a detected height pattern. As shown by FIG. 13, regarding the height pattern the emphasis is placed on the height information, and, therefore, even when the accuracy of the two-dimensional information is deteriorated, the height information can be detected without being lost. Therefore, by coarsening the pixel size compared with the pixel pattern shown in FIG. 15, as detected by the two-dimensional detection device, by a multiplication factor of an integer, as shown in FIG. 13, the picture processing time for providing the height picture output 9-19 in the picture processing device 9-11 can be shortened. Further, when a high accuracy is requested for determining a defect on the pattern 9, the high accuracy can be realized by making more fine the two-dimensional picture size showing the three-dimensional shape detected by the three-dimensional detecting device by a factor of 1 to an integer as little as the picture size detected by the two-dimensional detecting device.

Notation 10-1 designates one pixel in the height picture as the height picture output 9-19 when the pixel is coarsened twice as much as the pixel size shown by FIG. 15, as detected by the two-dimensional detecting device. Notation 10-2 designates a result of detecting the height of the substrate 9-20 as the height picture output 9-19 where the height is detected as 0. Notation 10-6 designates a result of detecting the height of the surface of the pattern 9-21 as the height picture output 9-19 where the height is detected as 7. Notation 10-5 designates a result of detecting the height of the thickness deficiency defect 9-23 as the height picture output 9-19 where the height is detected as 3. In this way, as shown by FIG. 13, three-dimensional shape information is obtained as the height picture output 9-19 from the picture processing device 9-11.

FIG. 14 shows an example of the two-dimensional detecting device. Light from a lamp 11-5 is irradiated onto the printed board 11 that is an object of inspection via a ND (Neutral Density) filter 11-6, a half mirror 11-2 and a lens 11-1. The copper wiring patterns 8 and 9 are formed on the printed board 11.

Generally, with respect to the printed board 11, reflected or scattered light from the wiring patterns 8 and 9 is stronger than reflected or scattered light from the surface of the substrate 10, which is made of an organic material. The reflected or scattered light from the printed board 11 is taken as a picture at the CCD sensor 11-4, having been received via the lens 11-1, the half mirror 11-2 and a ND filter 11-3.

Further, a very weak fluorescence picture generated from the surface of the substrate 10 of the printed board 11 may be taken by the CCD sensor 11-4 as shown by FIG. 1 and FIG. 5. In this case, it is necessary to irradiate an exciting light and completely shield reflected or scattered light from the wiring patterns 8 and 9. Further, data 11-15 of the picture is inputted to the picture processing device 11-9 where the data is processed at a pretreatment device 11-10, which performs stage variation correction 11-11 for correcting the positional shift of the picture that is sampled on the basis of the displacement of the stage measured by a laser length measuring machine or the like, shading correction 11-12 and light amount distribution correction 11-13 for correcting for an aging change of the irradiation light amount. The output of the pretreatment device 11-10 is converted into a binary signal for each of the pixels by the binarized circuit 11-14, as shown in FIG. 15.

In this way, as shown by FIG. 15, the binarized signal 11-16 shows the two-dimensional shape of the printed board 11 where the pictures of the wiring pattern portions 8 and 9 are brightened and the picture of the substrate 9-20 is darkened. Incidentally, the data need not necessarily be converted into a binarized signal, but may be a signal of multiple values, that is, a grey scale signal.

In the meantime, along with the shading correction 11-12 and the light amount distribution correction 11-13, before carrying out the inspection, a standard sample having a standard brightness is mounted on the XY stage, the picture signal is detected by detecting the brightness provided from the standard sample by the CCD sensor 11-4, and a shading correction coefficient and a light amount distribution correction coefficient are calculated, such that the picture signal is provided with a desired brightness. Thereby, in the actual inspection, a correction can be carried out by multiplying the signal with the above-described calculated shading correction coefficient in the shading correction 11-12 and multiplying the signal with the above-described calculated light amount distribution correction coefficient in the light amount distribution correction 11-13.

FIG. 15 shows a result of the two-dimensional shape inspection performed by the two-dimensional detecting device. Notation 12-1 designates one pixel as a binarized signal output 11-16 when the pixel size is made fine to half of the pixel size shown by FIG. 13 that is detected by the three-dimensional detecting device. The value of a pixel 12-2 designates a result of detecting the substrate 10 where the value is detected as 0, that is, the substrate surface portion. A pixel 12-6 designates a result of detecting the surfaces of the patterns 8 and 9 where the value is detected as 1, that is, the wiring pattern portion. A pixel 12-5 is a result of detecting the pattern thickness deficiency defect 9-23 where the value is detected as 1, that is, the wiring pattern portion. A pixel 12-7 designates a result of detecting the copper residue defect 9-22 where the value is detected as 1, that is, the wiring pattern portion.

Then, as shown by FIG. 12, by comparing the binarized signal output 11-16 with a reference signal 9-45 indicating the wiring pattern portion in a defect determining circuit 9-41, the copper residue defect 9-22 can be detected. As the reference signal 9-45, a printed board having no defect is mounted on the XY stage in the two-dimensional detecting device shown in FIG. 14, a picture is taken by the CCD sensor 11-4, the binarized signal output 11-16 showing the wiring pattern portion obtained from the picture processing device 11-9 is stored and the stored binarized signal output 11-16 may be used. Further, as the reference signal 9-45, a binarized signal showing the wiring pattern portion may be formed on the basis of design information of the printed board.

In this case, when FIG. 13 showing the three-dimensional detection result is compared with FIG. 15 showing the two-dimensional detection result, the pattern thickness deficiency defect 9-23 is detected in the comparison determining circuit 9-44 of the picture processing device in the three-dimensional detection device, and the copper residue defect 9-22 is detected by the defect determining circuit 9-41 of the picture processing device 9-40 in the two-dimensional detection device. In this case, when FIG. 13 showing the three-dimensional detection result 9-11 is binarized by, for example, a threshold 6 (a value of 6 or more is determined as normal thickness) in the comparison determining circuit 9-44, a pixel having a value of less than 6 is designated as white with a value of 1 and a pixel having a value of 6 or more is designated by a hatching with a value of 0, the binarized picture 16-4 is provided as the three-dimensional shape detection result shown in FIG. 16.

Figure 16:
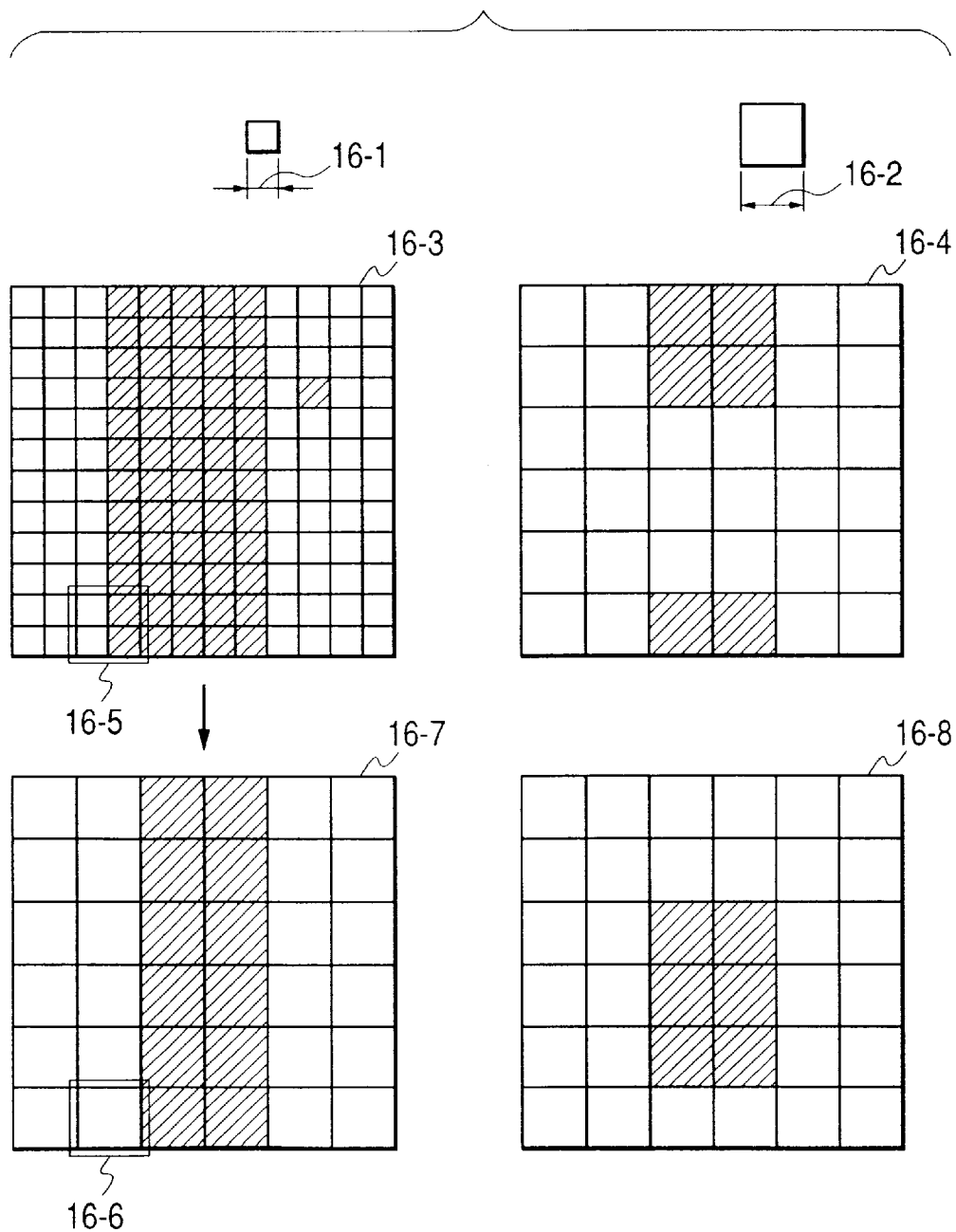
FIG. 16 illustrates diagrams for explaining a processing in which a pixel size in respect of a result of two-dimensional detection is made to comply with a result of three-dimensional detection.

Further, with respect to the picture of the two-dimensional shape detection result shown in FIG. 15, when a pixel having a value of 0 is designated as white and a pixel having a value of 1 is shown by hatching, the two-dimensional shape detection result 16-3 shown in FIG. 16 is obtained. In this case, the pixel size 16-2 in the three-dimensional shape detection result (height picture output) 16-4 is twice as much as the pixel size 16-1 in the two-dimensional shape detection result (binarized signal output) 16-3, and, therefore, four pixels 16-5 in the pattern 16-3 are coalesced into one pixel 16-6, the value of which is compared with the value of the pixel of the pattern 16-4. In a coalescing circuit 9-43 of the picture processing device 9-40, by coalescing 2×2 pixels 16-5 into one pixel 16-6, a two-dimensional binarized signal 16-7 showing the wiring pattern portion is obtained.

In this case, when all the pixels in the four pixels to be coalesced are provided with a value 1, the coalesced pixel is provided with a value 1, and when even one pixel is provided with a value 0, the coalesced pixel is provided with a value 0. The result of the coalescing operation is shown by the pattern 16-7. Then, in the comparison determining circuit 9-44, when the two dimensional binarized signal 16-7 indicating the wiring pattern portion is compared with the two-dimensional binarized signal 16-4 showing the three-dimensional shape detection result pixel by pixel by, for example, by a logical comparison, as shown by a pattern 16-8, the pattern thickness deficiency defect 9-23 can be detected. Further, the location of the pattern thickness deficiency defect 9-23 and the location of the copper residue defect 9-22 can summarizingly be displayed by displaying means, such as a display or the like, connected to the picture processing device 9-40, or can be outputted as defect coordinates to outputting means (including a record medium or network) including displaying means, such as a display or the like, connected to the picture processing device 9-40.

According to the embodiments of the present invention as explained above, when a wiring pattern of a circuit board, such as a printed board or the like, is inspected and a detected defect is modified, a printed board having high reliability can be fabricated in a short period of time and inexpensively.

Figure 17:
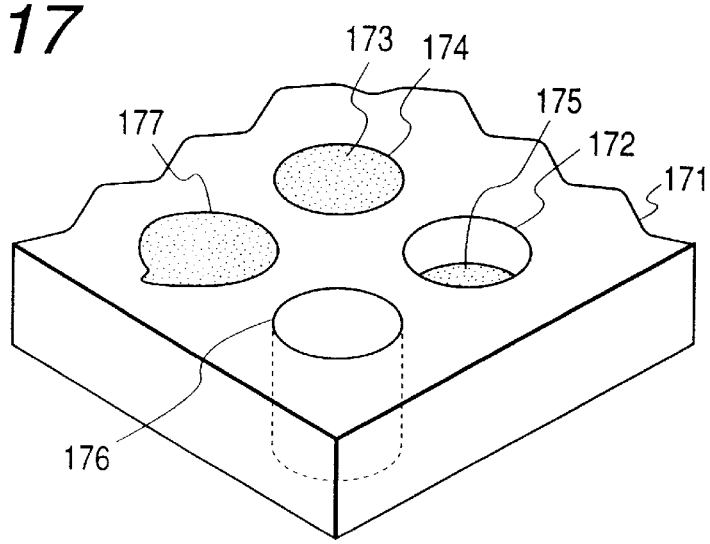
FIG. 17 is a perspective view showing how conductive paste is filled in through holes perforated at a substrate of a green sheet or the like that is an object for inspection.
Figure 18A:
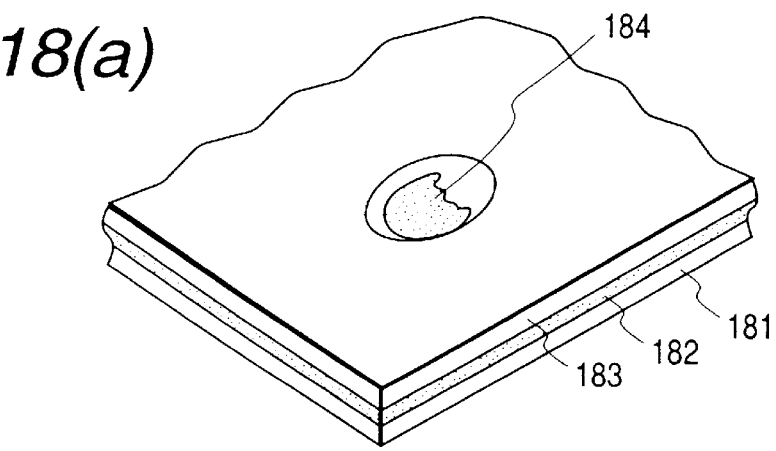
FIGS. 18(a) and 18(b) are a perspective view and a sectional view, respectively, showing inspection of residue of resist in a photo via hole in a printed board as an object for inspection.
Figure 18B:
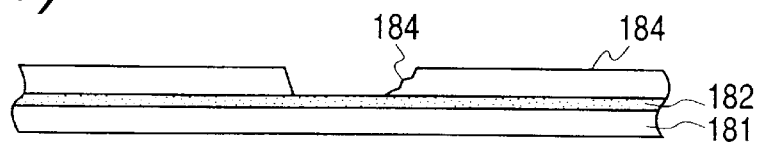

Further, although, according to the embodiments explained above, a printed board is exemplified as a detection object, the detection object may be any body necessitating three-dimensional shape detection, and, in this regard, the present invention is applicable to an electric circuit pattern, a micro machining part or the like emitting fluorescence. That is, FIG. 17 shows inspection of a state of filling a conductive paste 173, including copper or the like, into a through hole 172 perforated in a substrate 171 of a green sheet or the like as a detection object. Numeral 174 designates a state where the conductive paste is filled normally into the through hole, numeral 175 shows a state where the conductive paste is deficiently filled into the through hole, numeral 176 shows a state where the conductive paste is not filled into the through hole at all, and numeral 177 shows a state where the conductive paste is excessively filled into the through hole. Further, FIGS. 18(*a*) and 18(*b*) show inspection of resist residue in a photo via hole in a printed board. FIG. 18(*a*) is a perspective view thereof, and FIG. 18(*b*) is a sectional view thereof. Numeral 181 designates a substrate, numeral 182 designates a conductive layer of copper or the like for forming a wiring pattern which is formed on the substrate 181, and numeral 183 designates a photosensitive resist layer which is formed on the conductive layer 182 and in which an etching pattern is formed. Numeral 184 designates resist residue.

As a detection objective, other than the above-described objects, there is inspection of a shape of a rail in a thin film magnetic head or the like.

According to the present invention, an effect capable of inspecting the three-dimensional shape of a solid shaped pattern present at a specific portion of a detection object can be achieved.

Further, according to the present invention, an effect capable of inspecting a defect caused by a deficiency in the thickness of a pattern on a substrate of a printed board or the like by detecting the defect at high speed and with high accuracy is achieved.

Further, according to the present invention, an effect capable of inspecting both a defect caused by deficiency in the thickness of a pattern on a substrate of a printed board or the like and a very fine foreign object defect having almost no thickness by detecting the defects at high speed and with high accuracy can be achieved.

Further, according to the present invention, an effect capable of fabricating a substrate of a printed board or the like having high quality at low cost can be achieved.

What is claimed is:

1. A method of inspecting a three-dimensional shaped defect comprising the steps of:

detecting a first picture signal including providing a two-dimensional picture signal by taking a picture of an inspection object utilizing detection of fluorescence emanating from the inspection object;

selecting a three-dimensional shape inspection region of the inspection object based on the two-dimensional picture signal provided by the first picture signal detecting step;

detecting a second picture signal including detecting a picture signal by taking an optical picture in accordance with a height of the inspection object utilizing reflected light from the inspection object; and determining a three-dimensional shape including determining the presence or absence of a defect of a three-dimensional shape by calculating the three-dimensional shape by sampling height information with a desired two-dimensional pixel size in respect of the three-dimensional shape inspection region selected with respect to the picture signal detected by the second picture signal detecting step.

2. The three-dimensional shaped defect inspecting method according to claim 1, wherein in the three-dimensional shape inspection region selecting step, a three-dimensional shape inspection region having high accuracy and a three-dimensional shape inspection region having low accuracy are dividedly selected in respect of the inspection object based on the two-dimensional picture signal provided at the first picture signal detecting step; in the three-dimensional shape determining step, height information having a high accuracy is sampled with a desired two-dimensional pixel size in respect of the three-dimensional shape inspection region having high accuracy which has been selected with respect to the picture signal detected by the second picture signal detecting step; and height information having a low accuracy is sampled with the desired two- dimensional pixel size in respect of the three-dimensional shape inspection region having low accuracy which has been selected with respect to the detected picture signal.

3. The three-dimensional shaped defect inspecting method according to claim 1, wherein the desired two-dimensional pixel size in the three-dimensional shape determining step is set to one of a multiplication factor of an integer and one divided by an integer of the pixel size of the two-dimensional picture signal in the three-dimensional shape inspection region selecting step.

4. A method of inspecting a defect of a pattern comprising the steps of:

detecting a two-dimensional picture signal including detecting a two-dimensional picture signal by taking a picture of an inspection object utilizing detection of fluorescence emanating from the inspection object;

detecting a two-dimensional defect including detecting a two-dimensional defect on the inspection object based on the two-dimensional picture signal detected by the two-dimensional picture signal detecting step;

selecting a three-dimensional shape detection region in respect of a pattern formed on the inspection object based on the two-dimensional picture signal detected by the two-dimensional picture signal detecting step; and determining a three-dimensional shape including determining the presence or absence of a defect by calculating a three-dimensional shape in respect of the pattern by detecting the picture signal by taking an optical image in accordance with a height by a reflected light from above the inspection object and sampling height information with a desired two-dimensional pixel size in respect of the selected three-dimensional shape detection region with respect to the detected picture signal.

5. The method of inspecting a defect of a pattern according to claim 3, wherein the desired two-dimensional pixel size in the three-dimensional shape determining step is set to one of a multiplication factor of an integer and one divided by an integer of the pixel size of the two- dimensional picture signal in the two-dimensional picture signal detecting step.

6. A three-dimensional shaped defect inspecting method comprising the steps of:
   taking a picture including providing a two-dimensional picture signal by taking a picture of an inspection object utilizing detection of fluorescence emanating from the inspection object;
   selecting a three-dimensional shape inspection region of the inspection object based on the two-dimensional picture signal provided by the picture taking step;
   calculating a three-dimensional shape in the three-dimensional shape inspection region in respect of the inspection object selected by the three-dimensional shape inspection region selecting step in accordance with height information of the inspection object obtained utilizing reflected light from the inspection object; and
   a defect detecting step of determining the presence or absence of a defect of the three-dimensional shape calculated by the three-dimensional shape calculating step.

7. A three-dimensional shaped defect inspecting device comprising:
   picture taking means for providing a two-dimensional picture signal by taking a picture of an inspection object utilizing detection of fluorescence emanating from the inspection object;
   picture detecting means for detecting a picture signal by taking a picture in correspondence with a height of the inspection object utilizing reflected light from the inspection object, said picture detecting means corresponding to the height;
   three-dimensional shape inspection region selecting means for selecting a three-dimensional shape inspection region in respect of the inspection object based on the two-dimensional picture signal provided by the picture taking means;
   three-dimensional shape calculating means for calculating a three-dimensional shape of the three-dimensional shape inspection region selected based on the picture signal detected by the picture detecting means in correspondence with the height; and
   defect detecting means for determining presence or absence of a defect of the three-dimensional shape calculated by three-dimensional shape calculating means.

8. A three-dimensional shaped defect detecting device comprising:
   first picture detecting means for providing a two-dimensional picture signal by taking a picture of an inspection object utilizing detection of fluorescence emanating from the inspection object;
   second picture detecting means for providing a picture signal of the inspection object in accordance with a height of the inspection object obtained from reflected light from the inspection object by taking a picture of the inspection object;
   three-dimensional shape inspection region selecting means for selecting a three-dimensional shape inspection region of the inspection object based on the two-dimensional picture signal provided by the first picture detecting means; and
   defect detecting means for calculating a three-dimensional shape of the three-dimensional shape inspection region selected based on the picture signal provided by the second picture detecting means and determining the presence or absence of a defect of the calculated three-dimensional shape.

9. The three-dimensional shaped defect inspecting device according to claim 8, wherein the defect detecting means calculates the three-dimensional shape of the three-dimensional shape inspection region by sampling height information with a desired two-dimensional pixel size in respect of the picture signal in accordance with the height.

10. An inspection method comprising the steps of:
    relatively scanning a light beam on a sample to be detected;
    detecting fluorescence emanated from the sample by the scanned light beam;
    calculating a two-dimensional image of the sample from the detected fluorescence;
    determining an inspection area to obtain a three-dimensional image from the calculated two-dimensional image of fluorescence;
    detecting light reflected from the inspection area by the scanning of the light beam to obtain height information of the sample;
    calculating a three-dimensional image of the inspection area from the information of the two-dimensional image and the height information;
    detecting a defect in the inspection area from the calculated three dimensional image; and
    outputting a result of the detection.

11. An inspection method according to claim 10, wherein said sample is a printed circuit board.

12. An inspection method according to claim 10, wherein the light reflected from the inspection area is light reflected from a pattern of the printed circuit board and the three-dimensional image is an image of the pattern.

13. An inspection method comprising the steps of:
    illuminating a sample to be inspected with a scanning light;
    detecting fluorescence emanated from the sample by illuminating and obtaining a two-dimensional image of the sample;
    detecting light reflected from an inspection area determined from the two-dimensional image;
    calculating a three-dimensional image of the inspection area from the information of the detected fluorescence and the reflected light;
    detecting a defect in the inspection area from the calculated three-dimensional image; and
    outputting a result of the detection.

14. An inspection method according to claim 13, wherein the light illuminating the sample is a light beam which relatively scans the sample.

15. An inspection method according to claim 13, wherein the sample is a printed circuit board, which has a circuit pattern formed on a substrate, and the fluorescence is emanated from the substrate and the light reflected from the inspection area is light reflected from the pattern.

16. An inspection method according to claim 13, wherein the three-dimensional image is calculated using an information of the two-dimensional image of the fluorescence and height information of the inspection area obtained in accordance with the reflected light.

17. An inspection method comprising the steps of:

illuminating a light on a sample to be detected;

detecting a fluorescence emanated from the sample by the illuminating light to obtain a two-dimensional image of the sample;

determining a first inspection area to obtain a three-dimensional image with high resolution and determining a second inspection area to obtain a three-dimensional image with low resolution from the calculated two-dimensional image of fluorescence;

detecting light reflected from a first inspection area by the illumination and obtaining a three-dimensional image with high resolution;

detecting a light reflected from a second inspection area by the illumination and obtaining a three-dimensional image with low resolution;

detecting a defect in the first and second inspection areas from the calculated three-dimensional image; and outputting a result of the detection.

18. An inspection apparatus comprising:

illuminating means for illuminating a light on a sample to be detected;

first detecting means for detecting fluorescence emanated from the sample by the illuminating means and for obtaining a two-dimensional image of the sample;

second detecting means for detecting light reflected from an inspection area determined from the two-dimensional image;

calculating means for calculating a three-dimensional image of the inspection area from the information of the first and the second detecting means;

third detecting means for detecting a defect in the inspection area from the calculated three-dimensional image; and outputting means for outputting a result of the third detecting means.

19. An inspection apparatus according to claim 18, wherein the illuminating means illuminates the sample with light having a wavelength between 200–400 nm.

20. An inspection apparatus according to claim 18, wherein said first detecting means detects a fluorescence having a wavelength between 400–600 nm and the second detecting means detects light reflected from an inspection area having a wavelength between 200–400 nm.

* * * * *